US012234373B2

(12) United States Patent
Seeger et al.

(10) Patent No.: US 12,234,373 B2
(45) Date of Patent: Feb. 25, 2025

(54) TWO-COMPONENT COATING COMPOSITION, METHOD FOR COATING A SUBSTRATE, COATED SUBSTRATE, AND USE OF SUCH COATING COMPOSITION FOR IMPROVING EROSION RESISTANCE

(71) Applicant: Akzo Nobel Coatings International B.V., Arnhem (NL)

(72) Inventors: Dirk Seeger, Oldenburg (DE); Christoph Piecha, Stadland (DE); Dieter Hohnholz, Gross Ippener (DE); Oliver Bölke, Cloppenburg (DE); Sandra Becker, Varel (DE)

(73) Assignee: Akzo Nobel Coatings International B.V., Amsterdam (NL)

( * ) Notice: Subject to any disclaimer, the term of this patent is extended or adjusted under 35 U.S.C. 154(b) by 679 days.

(21) Appl. No.: 17/277,526

(22) PCT Filed: Sep. 18, 2019

(86) PCT No.: PCT/EP2019/074937
§ 371 (c)(1),
(2) Date: Mar. 18, 2021

(87) PCT Pub. No.: WO2020/058301
PCT Pub. Date: Mar. 26, 2020

(65) Prior Publication Data
US 2021/0363382 A1 Nov. 25, 2021

(30) Foreign Application Priority Data
Sep. 20, 2018 (EP) ..................................... 18195806

(51) Int. Cl.
| | |
|---|---|
| *C09D 175/06* | (2006.01) |
| *C08G 18/12* | (2006.01) |
| *C08G 18/32* | (2006.01) |
| *C08G 18/38* | (2006.01) |
| *C08G 18/42* | (2006.01) |
| *C08G 18/48* | (2006.01) |
| *C08K 3/34* | (2006.01) |
| *C08K 9/06* | (2006.01) |
| *C09D 175/08* | (2006.01) |

(52) U.S. Cl.
CPC ........... *C09D 175/06* (2013.01); *C08G 18/12* (2013.01); *C08G 18/3234* (2013.01); *C08G 18/325* (2013.01); *C08G 18/3838* (2013.01); *C08G 18/4277* (2013.01); *C08G 18/48* (2013.01); *C08K 3/34* (2013.01); *C08K 9/06* (2013.01); *C09D 175/08* (2013.01)

(58) Field of Classification Search
None
See application file for complete search history.

(56) References Cited

U.S. PATENT DOCUMENTS

| | | | |
|---|---|---|---|
| 3,428,610 A | 2/1969 | Klebert | |
| 4,463,126 A | 7/1984 | Gruber et al. | |
| 4,616,043 A | 10/1986 | Smith | |
| 2006/0046068 A1 | 3/2006 | Barancyk et al. | |
| 2007/0066786 A1* | 3/2007 | Hanson, Jr. | ........ C08G 18/3234 528/68 |
| 2007/0208156 A1* | 9/2007 | Posey | .................. C09D 175/02 528/44 |
| 2011/0288217 A1 | 8/2011 | Wamprecht et al. | |
| 2012/0071623 A1* | 3/2012 | Eling | .................. C09D 175/02 528/78 |
| 2013/0210997 A1 | 5/2013 | Kaune et al. | |
| 2014/0220358 A1 | 8/2014 | Kaune et al. | |
| 2017/0152398 A1 | 6/2017 | Hohnholz et al. | |
| 2017/0174933 A1 | 6/2017 | Hohnholz et al. | |
| 2017/0204234 A1 | 7/2017 | Walker et al. | |
| 2018/0002566 A1 | 1/2018 | Seeger et al. | |

FOREIGN PATENT DOCUMENTS

| | | |
|---|---|---|
| CN | 106010175 A | 10/2016 |
| JP | 2017075698 | 4/2017 |
| WO | 2006/055038 A1 | 5/2006 |
| WO | 2006/076724 A2 | 7/2006 |
| WO | 2007/039133 A1 | 4/2007 |
| WO | 2009/111227 A1 | 9/2009 |
| WO | 2010/032133 A2 | 3/2010 |
| WO | 2010/089034 A1 | 8/2010 |
| WO | 2010/122157 A1 | 10/2010 |

(Continued)

OTHER PUBLICATIONS

International Search Report and Written Opinion for corresponding application No. PCT/EP2019/074937 mailed Nov. 15, 2019.
European Search Report for corresponding application No. EP18195806.7, dated Mar. 19, 2019.
Abstract of CN106010175A, dated Oct. 26, 2016.
"Office Action," for Indian Patent Application No. 202117006221 mailed Sep. 20, 2022 (5 pages).
"Communication Pursuant to Article 94(3) EPC," for European Patent Application No. 19772698.7 mailed Mar. 14, 2023 (6 pages).

*Primary Examiner* — Michael M Dollinger
(74) *Attorney, Agent, or Firm* — Pauly, DeVries Smith & Deffner LLC

(57) ABSTRACT

The present disclosure relates to a two-component coating composition comprising: i) a base component comprising a di-amine resin, and ii) a curing component comprising a polyisocyanate prepolymer, wherein the two-component coating composition comprises less than 5 wt % of polyol resin. The present disclosure further relates to a method for coating a substrate using such two-component coating composition, to a coated substrate obtainable by such method, and to use of such coating composition for improving erosion resistance of a substrate.

20 Claims, No Drawings

(56) References Cited

FOREIGN PATENT DOCUMENTS

| | | |
|---|---|---|
| WO | 2012/032113 A1 | 3/2012 |
| WO | 2012/085276 A1 | 6/2012 |
| WO | 2012161774 | 11/2012 |
| WO | 2015/049260 A1 | 4/2015 |
| WO | 2015/120941 A1 | 8/2015 |
| WO | 2015/136018 A1 | 9/2015 |
| WO | 2016/000845 A1 | 1/2016 |
| WO | 2016/128166 A1 | 8/2016 |
| WO | 2017/207521 A1 | 12/2017 |

\* cited by examiner

TWO-COMPONENT COATING COMPOSITION, METHOD FOR COATING A SUBSTRATE, COATED SUBSTRATE, AND USE OF SUCH COATING COMPOSITION FOR IMPROVING EROSION RESISTANCE

CROSS-REFERENCE TO RELATED APPLICATIONS

This application is a 35 U.S.C. § 371 national phase application of PCT Application No. PCT/EP2019/074937 (WO 2020/058301 A1), filed on Sep. 19, 2019, which claims the benefit of priority to EP application Ser. No. 18/195, 806.7, filed on Sep. 20, 2018 each of which is incorporated herein by reference in its entirety.

FIELD OF THE INVENTION

The present invention relates to a two-component coating composition, to a method for coating a substrate using such two-component coating composition, to a coated substrate obtainable by such method, and to use of such coating composition for improving erosion resistance of a substrate.

BACKGROUND OF THE INVENTION

In various application areas there is a need for protective coatings fulfilling high mechanical demands. Examples include surfaces of objects that are exposed to erosive substances at high speed, such as rotor blades of wind turbines or helicopters, ship screws, and transport vehicles such as aircraft, trains, automobiles, and ships. Erosion is typically caused by liquid or solid substances that impinge on object surfaces, such as airborne sand, rain or hail. Erosive influences are particularly strong in the edge regions of such objects.

Surfaces of objects are typically protected against wear, in particular against erosion, by applying to such surfaces a protective coating or multiple-layer coating system. For effective erosion resistance, it is important to balance coating flexibility or elasticity and coating hardness. Excessive hardness and/or inadequate elasticity may be detrimental to effective erosion resistance.

There are various coating materials known for erosion protection of rotor blades of wind turbines. Polyurethane-based protective coatings are for example described in WO 2009/111227, WO 2010/122157, WO 2012/032113, WO 2012/085276, WO 2016/000845, and WO 2016/128166.

In WO 2009/111227 is disclosed a rain erosion resistant multi-layer coating system comprising a primer layer and a topcoat layer deposited from a film-forming component comprising hydroxyl and/or amine groups and an isocyanate curing agent wherein the ratio of isocyanate to hydroxyl and/or amine groups is above 1.

In WO 2010/122157 is disclosed a polyurethane coating composition for wind turbine blades comprising a polyurethane binder prepared from aliphatic polyester polyol(s) and polyisocyanate(s) having an average functionality of less than 3, wherein at least 50% of the polyisocyanate(s) are selected from a polyester-modified isocyanate prepolymer, an allophanate type polyisocyanate, or an uretdione.

In WO 2012/032113 is disclosed a rain erosion resistant two-component coating composition based on a polyol component and an isocyanate component having a free isocyanate group content of 10-15 wt % based on the weight of the isocyanate component and comprising a polyisocyanate-terminated polylactone.

In WO 2012/085276 is disclosed a rain erosion resistant two-component coating composition based on a polyol component comprising a polyurethane polymer containing OH groups and an isocyanate component having a isocyanate group content of 10-15 wt % based on the weight of the isocyanate component and comprising a polyisocyanate-terminated polylactone.

In WO 2016/000845 is disclosed a rain erosion resistant two-component coating composition comprising a base component comprising a polycarbonate diol and a diamine containing secondary amino groups and an aliphatic group between the nitrogen atoms, and a hardener component comprising a polyisocyanate-modified polyester having an isocyanate content of 4 to 15%.

In WO 2016/128166 is disclosed a solvent-based rain erosion resistant two-component coating composition suitable for spray application that comprises a base component comprising a polycarbonate diol, a further polyol, and an organosilane modified filler, and a polyisocyanate hardener component.

Further improvement in erosion resistant coatings is desirable, in particular in view of current challenges such as the construction of wind turbines rotor blades for wind-rich locations (off-shore), high blade speed during operation, and requirements in aircraft construction (weight reduction with equal or improved performance).

SUMMARY OF THE INVENTION

It has now been found that a two-component coating composition comprising a base component with specific isocyanate-curable di-amines with secondary amine groups and an hardener comprising a polyisocyanate prepolymer with two free isocyanate groups and a free isocyanate group content of from 3 to 9 wt % gives very good rain erosion resistance in the absence of or in the presence of only a small amount of polyol resin(s).

Accordingly, the present invention provides a two-component coating composition comprising
i) a base component comprising:
(A) a di-amine resin with two secondary amine groups of general formula

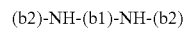

wherein
(b1) is a cycloaliphatic hydrocarbon group, preferably a cycloaliphatic hydrocarbon group with 5 to 18 carbon atoms; and (b2) is, independently, selected from the group consisting of $-C_nH_{2n}-CN$ wherein n is an integer in the range of from 2 to 6, $-CH_2CH_2-C(O)-O-C_mH_{(2m+1)}$ or $-CH_2CH(CH_3)-C(O)-O-C_mH_{(m2+1)}$ wherein m is an integer in the range of from 1 to 6, and optionally halogenated alkyl radicals with 2 to 10 carbon atoms; and
ii) a curing component comprising:
(B) a polyisocyanate prepolymer having two free isocyanate groups and an isocyanate content in the range of from 3 wt % to 9 wt %, based on solid weight of the polyisocyanate prepolymer; and
(C) optionally up to 3 wt % of a polyisocyanate with more than two free isocyanate groups, based on the total weight of polyisocyanates (B) and (C),
wherein the two-component coating composition comprises less than 5 wt % of polyol resin.

The coating composition provides improved erosion resistance compared to prior art coating compositions. Moreover, the coating composition can be cured without using a curing catalyst.

In a second aspect, the invention provides a method for coating a substrate comprising applying a two-component coating composition according to the first aspect of the invention to the substrate and allowing the applied coating composition to cure.

In a third aspect, the invention provides a coated substrate obtainable by a method according to the second aspect of the invention.

The coating composition according to the invention, when applied to a substrate, can be cured without using high temperature whilst yielding coatings with excellent erosion resistance. The coating composition according to the invention is therefore particularly suitable for application to substrates that are subject to severe erosive forces, such as rotor blades.

Therefore, in a final aspect, the invention provides use of a coating composition according to the first aspect of the invention for improving erosion resistance of a substrate.

DETAILED DESCRIPTION OF THE INVENTION

The coating composition according to the invention is a two-component coating composition. It comprises a base component i) and a curing component ii). Components i) and ii) are prepared and stored separately, and are not combined until shortly before application of the coating composition. The pot life (the time during which a coating composition can be applied at a temperature in the range of from 15° C. to 25° C. without the viscosity increasing as a result of crosslinking reactions to the extent that application is no longer possible) depends on the constituents used, in particular diamine resin (A), polyisocyanate prepolymer (B), optional polyisocyanate (C) and any polyol resin, if present. Typically, the pot life of the coating composition is in the range of from 0.1 minutes to 10 minutes, preferably of from 0.5 minutes to 5 minutes.

Curing of the two-component coating composition occurs through chemical reaction of reactive functional groups of the binder constituents in the coating composition, in particular through reaction of the secondary amine groups of diamine resin (A) with the polyisocyanate prepolymer (B), and optional polyisocyanate (C). Through these crosslinking reactions a coating film, i.e. a cured coating layer, is formed. The term "binder" is used herein in relation to those constituents in the coating composition that are primarily responsible for film formation, in particular the diamine resin and the polyisocyanate(s). The polyisocyanate(s), i.e. polyisocyanate prepolymer (B) and optional polyisocyanate (C), are also referred to as curing agent or crosslinking agent.

The coating composition according to the invention comprises in its base component a diamine resin (A) with two secondary amine groups of general formula (b2)-NH-(b1)-NH-(b2)

wherein:
(b1) is a cycloaliphatic hydrocarbon group, preferably a cycloaliphatic hydrocarbon group with 5 to 18 carbon atoms; and
(b2) is, independently, selected from the group consisting of $-C_nH_{2n}-CN$ wherein n is an integer in the range of from 2 to 6, $-CH_2CH_2-C(O)-O-C_mH_{(2m+1)}$ or $-CH_2CH(CH_3)-C(O)-O-C_mH_{(2m+1)}$ wherein m is an integer in the range of from 1 to 6, and optionally halogenated alkyl radicals with 2 to 10 carbon atoms.

Since di-amine resin (A) is a di-amine with two secondary amine groups, it has no amine groups other than the two secondary amine groups. The two nitrogen atoms in diamine (A) are linked through a divalent cycloaliphatic hydrocarbon group (b1). Reference herein to a cycloaliphatic hydrocarbon group is to a group in which at least some of the carbon atoms are linked in such way as to form one or more rings. Group (b1) only has carbon and hydrogen atoms and is preferably saturated. Group (b1) preferably has 5 to 18 carbon atoms, more preferably 6 to 14 carbon atoms. Very suitable (b1) groups are alkylated cyclohexyl groups, preferably methylcyclohexyl groups. Particularly preferred (b1) groups are the (b1) groups obtained when converting isophorone diamine, 1,3-diamino-2-methylcyclohexane, or 1,3-diamino-4-methylcyclohexane (all primary diamines) into the corresponding secondary diamine.

Group (b2) is, independently, selected from the group consisting of:
(b2-a) $-C_nH_{2n}-CN$, wherein n is an integer in the range of from 2 to 6;
(b2-b) $-CH_2CH_2-C(O)-O-C_mH_{(2m+1)}$ or $-CH_2CH(CH_3)-C(O)-O-C_mH_{(2m+1)}$, wherein m is an integer in the range of from 1 to 6, preferably n is 1 or 2; and
(b2-c) alkyl radicals with 2 to 10 carbon atoms, optionally halogenated.

Suitable (b2-c) groups include linear and branched alkyl radicals, optionally halogenated. Preferred (b2-c) groups are non-halogenated branched alkyl radicals with 3 to 10 carbon atoms, such as for example isopropyl.

Diamine resins (A) with (b2-a) or (b2-b) groups are obtainable by nucleophilic addition of an acrylic derivative onto a primary diamine with a (b1) group as described above between its nitrogen atoms. Suitable acrylic derivatives include (meth)acrylic nitriles such as acrylonitrile, methacrylonitrile, or allylnitrile and/or acrylic or methacrylic esters, in particular C1-C6 alkyl acrylic or methacrylic esters, more in particular C1-C2 alkyl acrylic or methacrylic esters. Diamine resins (A) with (b2-c) groups are obtainable by nucleophilic addition of a ketone (e.g. acetone or 3,3-dimethyl-2-butanone) or aldehyde onto a primary diamine with a (b1) group between its nitrogen atoms, followed by reduction of the resulting ketimine or aldimine. Alternatively, diamine resin (A) may be obtained by reacting a tertiary alkyl halide, e.g. tert.-butylchloride, with such primary diamine.

Preferably, both (b2) groups in di-amine (A) are $-CH_2CH_2-CN$ groups or branched alkyl groups, more in particular an isopropyl group or a group obtained by reacting the primary diamine with 3,3-dimethyl-2-butanone followed by reduction. More preferably both (b2) groups are $-CH_2CH_2-CN$ groups.

Examples of suitable primary amines for the preparation of diamine (A) include isophoronediamine, 1,3-diamino-2-methylcyclohexane, 1,3-diamino-4-methylcyclohexane, 3,3'-dimethyl-4,4'-diaminodicyclohexylmethane, and 4,4'-diaminodicyclohexylmethane.

Suitable diamines (A) are known in the art and commercially available. A particularly suitable diamine (A) is 3-[[5-(2-cyanoethylamino)-1,3,3-trimethylcyclohexyl]methylamino]propanenitrile; commercially available as Baxxodur PC 136 (ex. BASF) or JEFFLINK 136 (ex. Huntsman).

Preferably, the amount of diamine resin (A) in base component i) is such that the coating composition comprises di-amine resin (A) in an amount in the range of from 5 to 30 wt %, more preferably of from 6 to 25 wt %, even more preferably of from 7 to 20 wt %, based on the total weight of the coating composition.

Base component i) may comprise further isocyanate-reactive resins other than diamine (A), such as further polyamine resins or polyol resins. If such further isocyanate-reactive resin is a polyol, the amount of polyol resin is less than 5 wt % based on the total weight of the coating composition. Preferably, the coating composition comprises less than 3 wt % of polyol resin. More preferably, the coating composition is essentially free of polyol resin. Reference herein to 'essentially free of polyol resin' means less than 1 wt %, preferably less than 0.5 wt % of polyol resin, based on the total weight of the coating composition. It is particularly preferred that the coating composition is entirely free of polyol resin.

If such further isocyanate-reactive resin is a polyamine resin, the coating composition preferably comprises less than 30 wt % of such further polyamine resin, based on the total weight of diamine resin (A) and any further polyamine resin, more preferably less than 10 wt %. It is particularly preferred that base component i) does not comprise isocyanate-reactive polyamine resin other than diamine resin (A).

The curing component comprises a polyisocyanate prepolymer (B) that has two free isocyanate groups. The content of free isocyanate groups of polyisocyanate prepolymer (B) is in the range of from 3 wt % to 9 wt %, based on solid weight of the polyisocyanate prepolymer. The isocyanate content is determined in accordance with DIN EN ISO 11909, by reacting the polyisocyanate prepolymer with excess dibutylamine and back-titrating with hydrochloric acid against bromophenol blue.

Polyisocyanate prepolymer (B) preferably has a polyether, polyester, polyurethane, or mixed polyether-polyurethane or polyester-polyurethane backbone and two terminal isocyanate groups. Such polyisocyanate prepolymer (B) is obtainable by reacting a polyester diol, polyether diol and/or alkanediol, preferably a polyester diol or polyether diol, with a di-isocyanate monomer.

The di-isocyanate monomer is preferably an aliphatic di-isocyanate monomer, more preferably an aliphatic di-isocyanate monomer selected from the group consisting of dicyclohexylmethane-4,4'-diisocyanate (H12MDI), 1,6-hexamethylene diisocyanate (HDI), isophorone diisocyanate (IPDI), or a mixture of two or more thereof.

Preferably, the diol used in the preparation of polyisocyanate prepolymer (B) is an aliphatic diol, more preferably a saturated aliphatic diol. The diol may be branched or unbranched, preferably unbranched.

The polyester diol may be a polylactone polymer, i.e. a polyester prepared by ring-opening polymerization of lactones such as epsilon-caprolactone. In such polymerization, organic alcohols—usually diols—are employed as starter material or catalyst. If a diol is used, the resulting polylactone polymer is a polyester diol with two terminal hydroxyl groups. Suitable lactones for preparing such polyester diols are beta-propiolactone, gamma-butyrolactone, gamma-valerolactone, epsilon-caprolactone, or methyl-epsilon-caprolactone, preferably gamma-butyrolactone and epsilon-caprolactone, more preferably epsilon-caprolactone. Suitable starter alcohols include neopentyl glycol and ethylene glycol. A particularly preferred polyesterdiol is a polycaprolactone.

Any suitable polyether diol may be used. The polyether diol preferably is a polyethylene diol, polypropylene diol, or polytetrahydrofurane (poly(tetramethylene ether) glycol). Such polyether diols are known in the art and commercially available, for example as PolyTHF (ex. BASF).

The diol may have any suitable molecular weight, typically a weight average molecular weight in the range of from 100 to 15,000 g/mole.

Polyisocyanate prepolymer (B) preferably has a weight average molecular weight in the range of from 3,000 to 20,000 g/mole, more preferably of from 5,000 to 12,000 g/mole.

Reference herein to weight average molecular weight is to weight molecular weight as determined by gel permeation chromatography using polystyrene standards by methods known in the art.

Examples of commercially available polyisocyanate prepolymers (B) include Adiprene LW 520, Adiprene LFH 2840 (ex. Chemtura), and Desmodur XP 2406 (ex. Covestro).

Curing component ii) may comprise up to 3 wt % of a polyisocyanate (C) with more than two free isocyanate groups, based on the total weight of polyisocyanates (B) and (C). If such polyisocyanate (C) is present, it is preferably a polyisocyanate with a content of free isocyanate groups of less than 25 wt %. Such polyisocyanate (C) preferably is an aliphatic polyisocyanate, for example a trimer such as a biuret or an isocyanurate of an aliphatic di-isocyanate, or a prepolymer of an aliphatic polyester or polyether modified with an aliphatic di-isocyanate or with any of its dimers or trimers.

Preferably, the curing component ii) comprises less than 1 wt % of polyisocyanate (C). More preferably, curing compound ii) is free of polyisocyanate (C).

Curing component ii) may comprise a further polyisocyanate other than polyisocyanate compounds (B) and (C). If such further polyisocyanate is present, it is preferably present in an amount less than 10 wt %, more preferably less than 5 wt %, based on the total weight of polyisocyanates. In a preferred embodiment, the curing component is free of any polyisocyanates other than polyisocyanates (B) and (C).

If the curing component comprises polyisocyanate (C) and/or any further polysiocyanate, the content of free isocyanate groups is preferably less than 15 wt %, more preferably less than 10 wt % based on the total weight of polyisocyanates.

In a particularly preferred embodiment, the curing component does not comprise any polyisocyanate other than polyisocyanate prepolymer (B).

Preferably, the coating composition comprises a total amount of polyisocyanate, i.e. polyisocyanate prepolymer (B), any polyisocyanate (C), and any further polyisocyanate, in an amount in the range of from 50 to 90 wt %.

The ratio of free isocyanate groups in curing component ii) to the amount of isocyanate-reactive groups (amine groups and any hydroxyl groups) in base component i) is preferably in the range of from 1.0:0.9 to 1.0:1.5.

Preferably, the total amount of resin compounds, i.e. the total amount of compounds (A), (B), (C), any polyol resin, and any further polyamine resin or polyisocyanate, in the coating composition is at least 50 wt %, more preferably at least 60 wt %, even more preferably at least 70 wt %, based on the total weight of the coating composition. Coating compositions comprising in the range of from 60 to 95 wt % resin compounds are particularly preferred.

The coating composition may comprise solid pigment particles, typically in base component i), preferably in an amount in the range of from 2 to 50 wt %, more preferably of from 5 to 40 wt %, based on the total weight of the coating composition. Solid pigment particles include color pigments and extender pigments (also referred to as fillers). Preferably, the coating composition comprises both color pigment particles (including white pigment such as titanium dioxide) and extender pigment particles.

Preferably, the coating composition comprises organosilane-modified solid pigment as extender pigment particles, more preferably in an amount in the range of from 2 to 30 wt % based on the total weight of the coating composition.

The solid pigment to be modified may be any inorganic filler known to be suitable for coating compositions. Such fillers include various substances, typically in granular or powder form, used to achieve particular physical properties of coating compositions. Suitable inorganic fillers include: carbonates such as calcium carbonate, dolomite or barium carbonate; sulfates such as calcium sulfate and barium sulfate; silicates and optionally phyllosilicates such as talc, pyrophyllite, mica, kaolin, feldspar, precipitated calcium, aluminum, calcium/aluminum, sodium/aluminum silicates, mullite, wollastonite, nepheline such as nepheline syenite, and silicon dioxide such as quartz and cristobalite. For the purpose of the present disclosure, the group of silicates includes silicon dioxide. Other suitable inorganic fillers are precipitated silicas or fumed silicas, and metal oxides such as aluminum hydroxide and magnesium hydroxide. Preferably, the inorganic filler is a silicate.

The inorganic filler is modified with organosilane. Modification of inorganic fillers with organosilane is known in the art. Such modification process and organosilanes suitable for such modification are for example described in detail in WO 2017/207521 (page 9, line 23 to page 12, line 12), incorporated herein by reference. Preferably, the inorganic filler is modified with an organosilane containing an epoxide or amino group, more preferably an organosilane containing an organic radical containing an epoxide group or an amino group bonded to the silicon atom via a carbon atom. By incorporating such epoxide or amino groups in the inorganic filler, the polarity of the filler is tuned and physical adsorption to other components of the coating composition is more effective.

Organosilane-modified inorganic fillers are commercially available, for example under the trade names Tremin, Treminex, Tremica or Silbond (from HPF The Mineral Engineers).

The particle size of the organosilane-modified pigment particles is not in itself a critical parameter and may be in the range common for fillers, typically of from a few micrometers to a few hundreds of micrometers. Preferably, the average particle size (D50) is in the range of from 0.1 μm to 100 μm, more preferably of from 1 μm to 50 μm, as measured by laser diffraction in accordance with ISO 13320: 2009.

In one preferred embodiment, the coating composition of the present disclosure comprises
in base component i):
  5 to 30 wt % of di-amine resin (A); and
  2 to 30 wt % of organosilane-modified extender pigment particles, and in curing component ii):
  50 to 90 wt % of polyisocyanates (B) and (C).

All weight percentages are based on the total weight of the coating composition.

The coating composition may comprise one or more organic solvents. It is a particular advantage that the coating composition can be produced in solvent-free form. Preferably, the coating composition comprises less than 10 wt % of organic solvents, more preferably less than 7.5 wt %, even more preferably less than 5 wt % of organic solvents or even less than 2.5 wt % of organic solvents.

Reference herein to "organic solvent" is to organic solvent as specified in Directive 1999/13/EC of the Council of Mar. 11, 1999 (published in the Official Journal of the European Union on Mar. 29, 1999). In the Directive an organic solvent is specified as a "volatile organic compound" which is used alone or in combination with other agents, and without undergoing a chemical change, to dissolve raw materials, products or waste materials, or is used as a cleaning agent to dissolve contaminants, or as a dissolver, or as a dispersion medium, or as a viscosity adjuster, or as a surface tension adjuster, or a plasticizer, or as a preservative. The aforementioned directive defines a "volatile organic compound" as an organic compound having, at 293.15 K, a vapour pressure of 0.01 kPa or more, or having a corresponding volatility under the particular conditions of use.

Examples of suitable organic solvents include: aliphatic and/or aromatic hydrocarbons such as toluene, xylene, solvent naphtha, Solvesso 100, or Hydrosol® (from ARAL); ketones, such as acetone, methyl ethyl ketone or methyl amyl ketone; esters, such as ethyl acetate, butyl acetate, butyl glycol acetate, 3-methoxy-n-butyl acetate, pentyl acetate, methoxypropyl acetate or ethyl ethoxypropionate; ethers such as dipropylene glycol methyl ether; alcohols; and hydrochlorocarbons. Particularly preferred organic solvents are aprotic solvents, such as esters, ketones or hydrocarbons. Examples of particularly suitable esters are esters of acetic acid such as C1-4-alkyl esters of acetic acid and C1-4-alkoxyalkyl esters of acetic acid, butyl acetate, 1- and 2-methoxypropyl acetate, butyl glycol acetate and 3-methoxy-n-butyl acetate. Examples of particularly suitable ketones are methyl isobutyl ketone, or diketones such as acetylacetone. Examples of particularly suitable hydrocarbon solvents are Shellsol A, or alkylbenzenes such as xylene and toluene.

The coating composition preferably contains no or only minor amounts of water. Preferably, the coating composition contains less than 1.0 wt %, more preferably less than 0.2 wt %, even more preferably less than 0.01 wt % of water, based on the total weight of the coating composition. Water is preferably not explicitly added, e.g. to adjust the viscosity of the coating composition, but merely present, if at all, in small amounts as part of typical coating additives.

The coating composition may comprise a molecular sieve or a plurality of molecular sieves. Reference herein to molecular sieves is to natural or synthetic zeolites with a relatively large internal surface area (about 600 to 700 m$^2$/g) and uniform pore diameter. Suitable molecular sieves have a pore size in the range of from 2 to 10 angstroms, preferably of from 3 to 4 angstroms. For example, high-porosity aluminium silicates with a pore size of 3 angstroms may be used. Preferably, the coating composition comprises a molecular sieve in an amount in the range of from 1 to 10 wt %, based on the total weight of the coating composition.

The coating composition may comprise, typically in its base component i), further components generally known as constituents for coating compositions, such as catalysts or additives.

The coating composition may comprise a curing catalyst for the catalysis of the reaction of amine groups and optional hydroxyl groups of the resins in base component i) with the isocyanate groups of the polyisocyanate(s) in curing component ii). Based on the total weight of the composition, the coating composition may comprise 0.01 to 2 wt % of a curing catalyst. Suitable curing catalysts are known in the art and include metal-comprising catalysts such as catalysts comprising tin, molybdenum, zirconium, or zinc, and amine catalysts such as 2-(2-dimethylaminoethoxy)ethanol. Particularly suitable curing catalysts are tin compounds such as dimethyltin dilaurate or dibutyltin dilaurate.

It is an advantage of the coating composition according to the present disclosure that it can be cured without using a curing catalyst. Therefore, in a preferred embodiment, the coating composition is free of a curing catalyst, in particular free of a tin-comprising catalyst.

The coating composition may comprise typical additives such as antioxidants, de-aerating agents, wetting agents, dispersants, adhesion promoters, rheology modifiers such as thickeners, waxes and wax-like compounds, biocides, matting agents, radical scavengers, light stabilizers or flame retardants. Additives may be present in customary amounts, typically in the range of from 0.1 to 10 wt %, based on the total weight of the coating composition.

The solids content of the coating composition according to the present disclosure is preferably at least 90 wt %, more preferably is in the range of from 95 to 100 wt %. By solids content (non-volatile fraction) is meant the weight fraction which remains as a residue on evaporation under specified conditions. In the present application, the solids content is determined according to DIN EN ISO 3251. This is done by evaporating the composition at 130° C. for 60 minutes.

The invention further relates to method for coating a substrate comprising applying the two-component coating composition according to the first aspect of the invention to the substrate and allowing the applied coating composition to cure.

The coating composition may be applied by any technique known in the art such as spraying, roller coating, brushing, pouring, or by cartridge application.

Following application, the applied coating is allowed to cure, preferably at a temperature of at most 80° C., more preferably at most 60° C., even more preferably at a temperature in the range of from 15 to 60° C. The time needed for complete curing varies with the curing temperature. Typical curing times are in the range of from 30 minutes to 10 days. Curing may for example require 30 minutes at a curing temperature in the range of from 40° C. to 60° C., or 7 days at a curing temperature in the range of from 15 to 25° C.

The cured coating suitably has a dry film thickness in the range of from 100 to 500 µm, preferably of from 150 to 400 µm.

The substrate may be any suitable substrate. The substrate preferably is a metal substrate, such as steel or aluminium, or a plastic substrate, more preferably a fiber-reinforced plastic substrate. Epoxy resin-based plastic substrates, in particular fiber-reinforced epoxy resin-based plastic substrates, are particularly preferred. Suitable fibers for reinforcement are glass fiber, aramid fiber and/or carbon fiber, or natural fibers, such as hemp or sisal. Preferred substrates are glass fiber-reinforced epoxy resin based plastic substrates. The substrate may have any desired size or shape.

The coating composition according to the present disclosure is advantageously applied to very large substrates, such as rotor blades, since it can be curried at room temperature (e.g. 15 to 25° C.), i.e. without the need for heat supply. Due to the very good erosion resistance of the resulting coatings, the coating composition is preferably applied to a substrate that will be exposed to rain or sand erosion, such as rotor blades of wind turbines or helicopters, ship screws, air vehicles such as airplanes. Particularly suitable substrates are rotor blades of wind turbines, and surfaces of airplanes.

Due to its high erosion resistance, the coating composition according to the present disclosure is preferably applied as a topcoat. The substrate to which it is applied may already comprise one or more coating layers (e.g. primer coating or surfacer coating) before applying the coating composition according to the first aspect of the invention as a topcoat layer.

The invention further relates to a coated substrate obtainable by a method according to the second aspect of the invention, i.e. to which a coating composition according to the first aspect of the invention has been applied followed by curing. Preferably the coated substrate comprises multiple coating layers and the coating composition according to the first aspect of the invention provides a topcoat layer.

The invention will be further illustrated by means of the following examples.

EXAMPLES

1. Test Methods 1.1 General Remarks

For laboratory determination of erosion resistance, a variety of equipment can be used that moves the coated substrate to be tested through an erosion medium or wherein the substrate is fixed and erosion medium flows around it. A stationary test specimen can for example be tested using high-pressure water jetting as typically used for water jet cutting. The erosion effect is controlled by water pressure, distance to the test specimen, and type and size of the nozzles. The effect can be intensified by the use of sand, corundum or silicon carbide. Alternatively, sand blasting or steam blasting may be used, wherein pressure, nozzle size, and distance to the test specimen may likewise be used to control the erosion effect and adapt it to realistic conditions.

In rain erosion tests for moving test specimen, the coated substrate is attached to a rotor or a disk and is radially moved through a curtain of water droplets or of mixtures of water droplets and salt or sand. The most common test scenario used in the wind energy industry operates with velocities of 140 m/s and a rain volume of 30 l/h. In the airplane industry, velocities of up to 220 m/s are used, with a comparable rain volume. The test for rain erosion resistance may be carried out in accordance with ASTM G 73.

1.2 Test Conditions

Rain erosion resistance was tested in accordance with ASTM G 73. Test specimens were spun with a velocity of 140 m/s through a curtain of water droplets. The rain volume was kept constant at 30 l/h. The droplet size of the applied "rain" was on average 5-6 mm. The test was carried out at a temperature of 20 to 25° C. The test specimens were visually evaluated at time intervals of 15 minutes. The erosion resistance corresponds to the time until the substrate was visible through the coating.

2. Preparation of Coating Compositions and Coated Substrates

Base components and curing components for various coating compositions (I=inventive; C=comparative) were prepared by combining the respective constituents and homogeneously mixing them in a dissolver. In Table 1, details of the polyisocyanate compounds used are given. In Table 2, the composition of the coating compositions is given. For each coating composition, the base component and the curing component were homogeneously mixed in the proportions indicated in Table 2.

Immediately after preparation, the coating compositions were applied (brush application) to a glass fiber-reinforced epoxy resin based test specimen already coated with a commercially available polyurea-based pore filler. Curing took place by storage at 20 to 25° C. for 7 days. The dry film thickness of the cured coating was 300 micrometers.

The rain erosion resistance of the multiple coat (pore filler coat and topcoat) thus formed was investigated. The results are shown in Table 2.

TABLE 1

Polyisocyanates used

| Name | NCO content (wt % on solids) | Number of free NCO groups | Description |
|---|---|---|---|
| Adiprene LW 520 | 4.8 | 2 | H12MDI-terminated polyether prepolymer |
| Desmodur XP 2406 | 3.5 | 2 | IPDI-terminated prepolymer |
| Adiprene LFH 2840 | 6.7 | 2 | HDI-terminated poly-caprolactone prepolymer |
| Desmodur N3600 | 23 | >3 | HDI isocyanurate |
| Desmodur N100 | 22 | >3 | HDI biuret |
| Desmodur XP2838 | 21 | >3 | HDI/IPDI polyisocyanate |

TABLE 2

Composition and characteristics of coating compositions

| Constituent | Weight of constituent (g) | | | | | | | | | |
|---|---|---|---|---|---|---|---|---|---|---|
|  | I1 | I2 | I3 | I4 | I5 | C1 | C2 | C3 | C4 | C5 |
| Base component | | | | | | | | | | |
| Sec. diamine 1[a] | 44 | 44 | 44 |  | 44 | 44 | 44 | 44 | 6.0 | 7.2 |
| Sec. diamine 2[b] |  |  |  | 24 |  |  |  |  |  |  |
| Linear aliphatic polycarbonate diol 1[c] | — | — | — | — | — | — | — | — | 77 |  |
| Linear aliphatic polycarbonate diol 2[d] |  |  |  |  |  |  |  |  |  | 82 |
| Aminosilane-modified wollastonite | 22 | 22 | 22 | 32.2 | 22 | 22 | 22 | 22 | — |  |
| Molecular sieve | 4.5 | 4.5 | 4.5 | 4.5 | 4.5 | 4.5 | 4.5 | 4.5 | 4.0 | 3.0 |
| Additives | 4.5 | 4.5 | 4.5 | 4.5 | 4.5 | 4.5 | 4.5 | 4.5 | 8.0 | 4.0 |
| Color pigment | 25 | 25 | 25 | 40 | 25 | 25 | 25 | 25 | 5.0 | 3.8 |
| Total base component | 100 | 100 | 100 | 100 | 100 | 100 | 100 | 100 | 100 | 100 |
| Curing component | | | | | | | | | | |
| Adiprene LW 520 | 350 |  |  | 225 | 156 | 152 | 152 | 152 |  |  |
| Desmodur XP 2406 |  | 480 |  |  |  |  |  |  |  |  |
| Adiprene LFH 2840 |  |  | 200 |  |  |  |  |  | 180 | 38.8 |
| Desmodur N3600 |  |  |  |  | 4 | 8 |  |  |  |  |
| Desmodur N100 |  |  |  |  |  |  | 8 |  |  |  |
| Desmodur XP2838 |  |  |  |  |  |  |  | 8 |  | 58.2 |
| Total curing component | 350 | 480 | 200 | 225 | 160 | 160 | 160 | 160 | 180 | 97 |
| Total coating composition | 450 | 580 | 300 | 325 | 260 | 260 | 260 | 260 | 280 | 197 |
| Rain erosion test duration at 30 L/h (hours) | 20 | 30 | >40 | >40 | 30 | 10 | 10 | 10 | 17 | 15 |

[a]Secondary diamine 1: 3-[[5-(2-cyanoethylamino)-1,3,3-trimethylcyclohexyl]methylamino]propanenitrile (Baxxodur PC 136)
[b]Secondary diamine 2: a mixture of N,N'-diisopropyl-2-methyl-1,3-diaminocyclohexane and N,N'-diisopropyl-6-methyl-1,3-diaminocyclohexane
[c]Linear aliphatic polycarbonate diol 1: terminal OH groups; OH value is 225
[d]Linear aliphatic polycarbonate diol 2: terminal OH groups; OH value is 172

The invention claimed is:

1. A substrate coated with an erosion resistant coating composition, the substrate being selected from wind turbine rotor blades and helicopter rotor, blades, and the erosion resistant coating composition being a two-component erosion resistant coating composition comprising:
   i) a base component comprising:
      (A) a di-amine resin with two secondary amine groups of general formula (b2)-NH-(b1)-NH-(b2)

wherein
      (b1) is a cycloaliphatic hydrocarbon group; and (b2) is, independently, selected from the group consisting of
      —$C_nH_{2n}$—CN wherein n is an integer in the range of from 2 to 6, —$CH_2CH_2$—C(O)—O—$C_mH_{(2m+1)}$ or —$CH_2CH(CH_3)$—C(O)—O—$C_mH_{(2m+1)}$ wherein m is an integer in the range of from 1 to 6 alkyl radicals with 2 to 10 carbon atoms, and halogenated alkyl radicals with 2 to 10 carbon atoms; and
   ii) a curing component comprising:
      (B) a polyisocyanate prepolymer having two free isocyanate groups and an isocyanate content in the range of from 3 wt % to 9 wt %, based on solid weight of the polyisocyanate prepolymer; and (C) optionally up to 3 wt % of a polyisocyanate with more than two free isocyanate groups, based on the total weight of polyisocyanates (B) and (C), wherein the two-component erosion resistant coating composition comprises less than 5 wt % of polyol resin.

2. A substrate according to claim 1, wherein the erosion resistant coating composition is essentially free of polyol resin.

3. A substrate according to claim 1, wherein (b1) is an alkylated cyclohexyl group.

4. A substrate according to claim 1, wherein both (b2) groups are —$CH_2CH_2$—CN groups.

5. A substrate according to claim 4, wherein diamine resin (A) is 3-[[5-(2-cyanoethylamino)-1,3,3-trimethylcyclohexyl]methyl amino]propanenitrile.

6. A substrate according to claim 1, wherein the base component comprises diamine resin (A) in such amount that the erosion resistant coating composition comprises in the range of from 5 to 30 wt % di-amine resin (A).

7. A substrate according to claim 1, wherein the base component comprises no isocyanate-reactive polyamine resin other than diamine resin (A).

8. A substrate according to claim 1, wherein the polyisocyanate prepolymer (B) is obtainable by reacting a polyester diol or a polyether diol with a di-isocyanate monomer.

9. A substrate according to claim 1, wherein the curing compound is free of polyisocyanate (C).

10. A substrate according to claim 1, wherein the base component comprises solid pigment particles, in such amount that the two-component erosion resistant coating composition comprises 2 to 50 wt % solid pigment particles.

11. A substrate according to claim 10, wherein the solid pigment particles comprise organosilane-modified extender pigment particles.

12. A substrate according to claim 1 wherein the two-component erosion resistant coating composition comprises:
5 to 30 wt % of di-amine resin (A);
50 to 90 wt % of polyisocyanates (B) and (C); and
2 to 30 wt % of organosilane-modified extender pigment particles.

13. A method for coating a substrate comprising:
applying a two-component erosion resistant coating composition as defined in claim 1 to the substrate; and
allowing the applied erosion resistant coating composition to cure;
wherein the substrate is selected from wind turbine rotor blades and helicopter rotor blades.

14. The method of claim 13, further comprising improving erosion resistance of the substrate.

15. The substrate of claim 1, wherein (b1) is a cycloaliphatic hydrocarbon group with 5 to 18 carbon atoms.

16. The substrate of claim 1, wherein the erosion resistant coating composition is cured.

17. The substrate of claim 16, wherein the erosion resistance of the cured erosion resistant coating composition is at least 20 h before the substrate is visible through the coating, when measured according to ASTM G73, with a spin velocity of 140 m/s, a rain volume of 30 l/h, an average droplet size of 5 to 6 mm, and a temperature of 20 to 25° C.

18. The method of claim 13, wherein the erosion resistance of the cured erosion resistant coating composition is at least 20 h before the substrate is visible through the coating, when measured according to ASTM G73, with a spin velocity of 140 m/s, a rain volume of 30 l/h, an average droplet size of 5 to 6 mm, and a temperature of 20 to 25° C.

19. The substrate of claim 1, the substrate being a wind turbine rotor blade.

20. The method of claim 13, wherein the substrate is a wind turbine rotor blade.

* * * * *